No. 847,029. PATENTED MAR. 12, 1907.
C. M. STEELY.
HEN'S NEST.
APPLICATION FILED MAY 18, 1906.

2 SHEETS—SHEET 1.

Witnesses
G. R. Thomas
F. B. MacNab

Inventor
C. M. Steely
By Chandler & Chandler
Attorneys

No. 847,029. PATENTED MAR. 12, 1907.
C. M. STEELY.
HEN'S NEST.
APPLICATION FILED MAY 18, 1906.

2 SHEETS—SHEET 2.

Witnesses
G. R. Thomas
F. B. MacNet

Inventor
C. M. Steely
By Chandler & Chandler
Attorneys

UNITED STATES PATENT OFFICE.

CHARLES M. STEELY, OF PHILADELPHIA, PENNSYLVANIA.

HEN'S NEST.

No. 847,029.　　　Specification of Letters Patent.　　　Patented March 12, 1907.

Application filed May 18, 1906. Serial No. 317,571.

*To all whom it may concern:*

Be it known that I, CHARLES M. STEELY, a citizen of the United States, residing at Philadelphia, in the county of Philadelphia, State of Pennsylvania, have invented certain new and useful Improvements in Hens' Nests; and I do hereby declare the following to be a full, clear, and exact description of the invention, such as will enable others skilled in the art to which it appertains to make and use the same.

This invention relates to hens' nests, and more particularly to that class of nests in which the eggs as they are laid are received in a suitable receptacle until it is desired to collect them, one object of the invention being to provide a novel form of receptacle of this character.

A further object of the invention is to provide a means whereby the nest may be kept clean and healthy, the compartment in which the above-mentioned receptacle is located being also designed to receive a suitable germicide or disinfectant.

Figure 1:
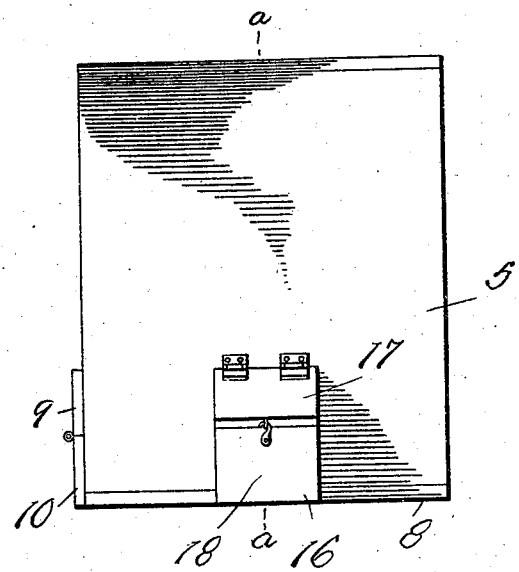
Figure 2:
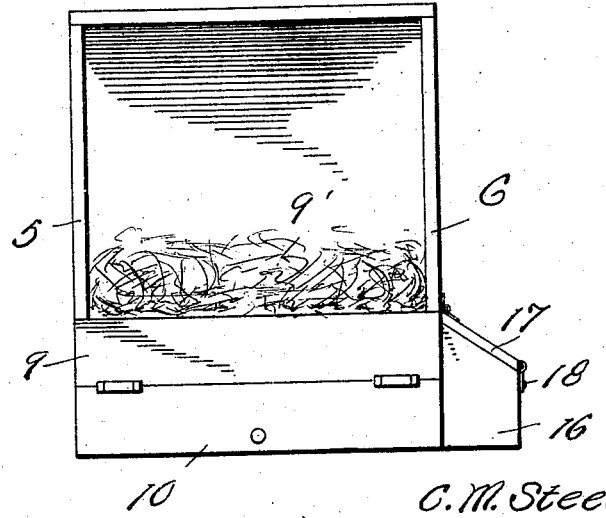
Figure 3:
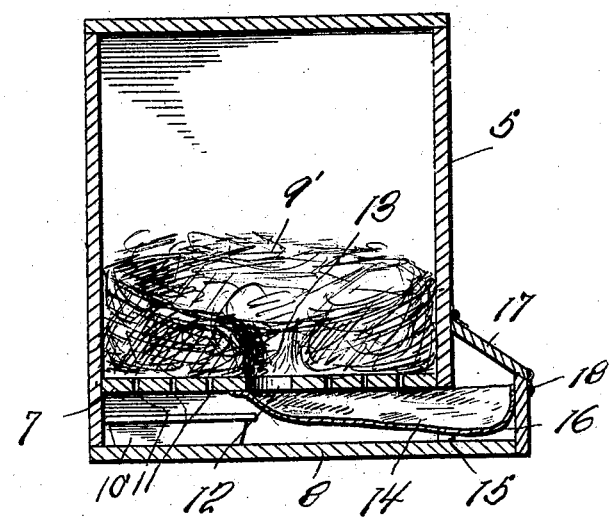
Figure 4:
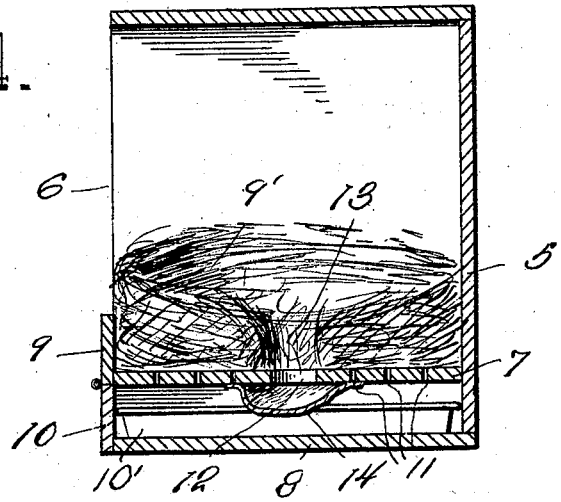

In the accompanying drawings, Figure 1 is a side elevation of the invention. Fig. 2 is a front elevation thereof. Fig. 3 is a vertical sectional view on the line a a of Fig. 1. Fig. 4 is a similar view taken in a plane at right angles to the plane of Fig. 3.

The invention comprises a casing 5, which is open at its front, as at 6, and includes a nest-floor 7 and a main floor 8. Secured at its ends to the sides of the casing, across the open front thereof, and extending upwardly a short distance from the front edge of the floor 7 is a strip 9, which serves to maintain the nest material 9' in the casing. In order that the compartment between the two floors may be normally closed on all sides, I provide a door 10, which is hinged at its upper edge to the lower edge of the strip 9, it being understood that communication may be had with the compartment by swinging the door upon its hinges for the purpose of placing therein trays 10' or the like, containing suitable germicides and disinfectants. In order that the odors from the disinfectants may permeate the nest and the upper compartment, I form a plurality of openings 11 in the floor 7. I also form through the floor 7, centrally thereof, an opening 12, and at a corresponding point in the nest 9' an opening 13, the said openings being designed for the passage of eggs as they are laid.

To protect the eggs from breakage and from the chemicals in the lower compartment and also to assemble them at a convenient point for collection, I provide a receptacle 14, which is preferably formed of cloth. The receptacle 14 is secured in any suitable manner at its upper edges to the under side of the floor 7, is arranged to receive, at one end, the eggs as they are delivered through the openings 12 and 13, and extends from the point to one side of the casing 5 and through an opening 15 therein. The opening 15 communicates with a casing 16, which is built upon this side of the casing 5, and the upper edges of the end of the receptacle 14, which extends through the opening 15, are secured to the inner walls of receptacle 16 at the upper edges thereof. As shown in Fig. 3, the cloth egg-receptacle 14 is deepened as it approaches the casing 16, thus causing the eggs to roll in that direction, and it will furthermore be noted that the receptacle 14 is in spaced relation to the floor 8 throughout its entire length to prevent breakage of the eggs as they fall into the same. To prevent entrance of rodents into the egg-receptacle, I provide a door 17 for the casing 16 and secure the same by any desired form of lock or latch 18.

From the foregoing it will be understood that the eggs as they are delivered from the nest will roll toward the casing 16 and may be collected therefrom at any desired time, and, furthermore, that by locating this casing to one side of the nest the eggs may be removed without disturbing the hen, if there be one on the nest.

What is claimed is—

A device of the class described comprising a casing including a nest-floor having an opening therein for the passage of eggs, a base-floor, one side of said casing being provided with an opening extending between the floors, a door hinged to said side of the casing in position to close the opening, an inclined flexible trough-shaped egg-receptacle located between the floor and in spaced relation to the base-floor and a tray removably located upon the base-floor and beneath the nest-floor.

In testimony whereof I affix my signature in presence of two witnesses.

CHARLES M. STEELY.

Witnesses:
　CHARLES OTTO,
　WM. R. WANDSLEB.